United States Patent
Holcomb et al.

(10) Patent No.: US 6,871,808 B2
(45) Date of Patent: Mar. 29, 2005

(54) APPARATUS FOR GRINDING MATERIAL, SUCH AS SPICE OR GRAIN

(75) Inventors: David A. Holcomb, Seattle, WA (US); Peter A. Ryding, Seattle, WA (US); Jason O. Germany, Seattle, WA (US)

(73) Assignee: Chef'N Corporation, Seattle, WA (US)

( * ) Notice: Subject to any disclaimer, the term of this patent is extended or adjusted under 35 U.S.C. 154(b) by 0 days.

(21) Appl. No.: 10/124,569

(22) Filed: Apr. 16, 2002

(65) Prior Publication Data

US 2003/0192971 A1 Oct. 16, 2003

(51) Int. Cl.⁷ .............................................. A47J 43/04
(52) U.S. Cl. .................................................. 241/169.1
(58) Field of Search ........................... 241/169.1, 262, 241/168, DIG. 17, 285.3

(56) References Cited

U.S. PATENT DOCUMENTS

| | | | |
|---|---|---|---|
| 1,020,380 A | 3/1912 | Williams | |
| 1,481,632 A | 1/1924 | Tatum | |
| 1,947,253 A | 2/1934 | Ellis | 60/52 |
| 3,237,873 A | 3/1966 | Raski | 241/27 |
| 4,226,370 A | 10/1980 | Watson | 241/30 |
| 4,374,574 A | 2/1983 | David | 241/169.1 |
| 4,573,244 A | 3/1986 | Holcomb et al. | 241/169 |
| 4,610,397 A | 9/1986 | Fischer et al. | 241/86 |
| 4,697,749 A | 10/1987 | Holcomb et al. | 241/169 |
| 4,830,291 A | 5/1989 | Williams | 241/73 |
| 5,082,190 A | 1/1992 | Chen | 241/169.1 |
| 5,660,341 A | 8/1997 | Perkins et al. | 241/93 |
| 5,685,501 A * | 11/1997 | Wagner | 241/169.1 |
| 5,730,374 A | 3/1998 | Wu | 241/169 |
| 5,988,543 A | 11/1999 | Wu | 241/168 |
| 6,616,076 B2 * | 9/2003 | Wong | 241/168 |

FOREIGN PATENT DOCUMENTS

| | | | |
|---|---|---|---|
| DE | 643 997 C | 4/1937 | |
| EP | 282259 A2 * | 9/1988 | A47J/42/10 |
| FR | 777375 A | 2/1935 | |
| FR | 821940 A | 12/1937 | |

* cited by examiner

*Primary Examiner*—Allen Ostrager
*Assistant Examiner*—Jimmy T Nguyen
(74) *Attorney, Agent, or Firm*—Seed IP Law Group PLLC

(57) ABSTRACT

A mill for grinding a spice or grain material has a grinding mechanism including: a lever mounted for pivotal movement about a lever axis, a grinder bit mounted for rotational movement about a grinder bit rotational axis, the grinder bit rotational axis being at least approximately parallel to the lever axis, and a linkage coupled to the grinder bit and coupled to the lever to transfer pivotal movement from the lever to the grinding bit. The grinder bit may be cylindrical and include a gradated set of teeth. A cam pivots an engagement surface to adjust a spacing between the engagement surface and the grinding bit to select a size of resulting particles.

35 Claims, 5 Drawing Sheets

APPARATUS FOR GRINDING MATERIAL, SUCH AS SPICE OR GRAIN

BACKGROUND OF THE INVENTION

1. Field of the Invention

This invention is generally related to grinding mechanisms, and more particularly to grinders or mills for grinding materials, such as spices and grain.

2. Description of the Related Art

Mills for grinding materials such as spices and grains are common household items. For example, pepper mills are ubiquitous in households and restaurants. Such mills generally include a housing or body which presents an attractive outward appearance, and which forms a chamber or reservoir for holding a material (e.g., peppercorns) to be ground. The body also typically encloses a grinding mechanism in fluid communication with the chamber, the grinding mechanism grinding the material and dispensing the ground material through an opening or exit in the bottom of the body. The grinding mechanism typically includes an actuator (e.g., crank arm, operating lever), a grinding bit, an engagement surface for cooperating with the grinding bit to grind the material therebetween, and a transmission drivingly coupling the actuator to the grinding bit. Often the body will form a second chamber, separate from the first chamber, for holding a material that does not requiring grinding (e.g., salt).

Most mills are hand operated and may be used by chefs or cooks in the preparation of food, or by servers and/or diners at dining tables. Many mills have a crank arm which is turned continuously and unidirectionally (e.g., clockwise or counterclockwise) with one hand of the user, while the other hand holds the mill in a generally vertical direction such that the ground material drops out of the bottom. Other mills have an operating lever which is reciprocatingly operated (i.e., bi-directionally) with the fingers or thumb of the hand holding the mill.

Typically, the grinding mechanisms fall into two categories, rotary mechanisms and linear mechanisms. Many rotary mechanisms are driven by turning a crank arm directly connected to a drive shaft of the grinding mechanism, which in turn is directly connected to the grinding bit. The crank arm, drive shaft and grinding bit each rotate about respective axes or rotation, the axes being parallel to each other, or even collinear. A number of rotary mechanisms are driven by reciprocating movement of an operating lever. Such rotary mechanisms include a grinding bit axially mounted on a drive shaft, and transmission means in the form of gears for translating the reciprocating motion of the operating lever into rotation of the drive shaft for driving the grinding bit. Again, the axes of rotation of the drive shaft and grinding bits are parallel or even collinear. Linear grinding mechanisms rely on linear movement of the grinding bit to grind the material. Typically, linear mechanisms employ the axial translation of a transmission element, such as a rack, to produce the linear translation of the grinding bit.

Most grinders also include mechanisms for adjusting the space between the grinding bit and the engagement surface to allow the user to select a desired grain size. In rotary mechanisms, the grinding bits are typically conical and having a uniform set of teeth around the periphery of the cone or truncated cone. The space between the engagement surface and the grinding bit may be adjusted by translating the conical grinding bit along its longitudinal axis with respect to the engagement surface. In linear mechanisms, the grinding bit typically takes the form of a straight or beveled surface having a set of uniform teeth. The space between the engagement surface and the grinding bit is adjusted by translating the grinding bit either toward or away from the engagement surface.

It is desirable to reduce the cost and complexity of mills. It is also desirable to produce mills that are sturdy and easy to operate. Further, it is desirable to provide a mill that efficiently and uniformly grinds material to any selected size.

BRIEF SUMMARY OF THE INVENTION

In one aspect, a mill for grinding a spice or grain material includes a body, a grinder bit at least partially received in the body and mounted for pivotal movement about a grinder bit rotational axis, a linkage at least partially received in the body and mounted for translation in a linkage plane, the linkage plane being non-parallel to the grinder bit rotational axis, the linkage coupled to the grinder bit at a point on the grinder bit spaced from the grinder bit rotational axis, and an engagement surface opposed to the grinder bit and spaced therefrom to cooperatingly receive the material to be ground therebetween.

In another aspect, a grinding mechanism for a grinder includes a lever mounted for pivotal movement about a lever axis, a grinder bit having a grinding surface, the grinder bit mounted for rotational movement about a grinder bit rotational axis, the grinder bit rotational axis being at least approximately parallel to the lever axis, and a linkage coupled to the grinder bit and coupled to the lever to transfer pivotal movement from the lever to the grinding bit.

In a yet another aspect, a grinding mechanism includes a grinding bit mounted for rotation, an engagement member having an engagement surface opposed to the grinding bit, the engagement member mounted for pivotal movement about an adjustment axis with respect to the grinding bit to selectively adjust a space between the grinding bit and the engagement surface of the engagement member to receive material to be ground therebetween, and a cam mounted for rotation, the cam having a first cam surface engaging a portion of the engagement member.

In a further aspect, a grinding bit for a spice grinder includes a cylindrical body having a peripheral edge, and a number of grinding protuberances extending along the peripheral edge between a first angular position and a second angular position, the grinding protuberances being of at least two different sizes, the grinding protuberances gradating in size between the first and the second angular positions. The grinding protuberances may, for example, take the form of teeth or knurls.

In yet a further aspect, a spice mill includes a lever mounted for pivotal movement about a lever axis, rotatable means for grinding mounted for rotation about a grinder rotation axis, the grinder axis parallel to the lever axis, and axial linkage means for coupling pivotal movement of the lever to the rotatable grinding means.

In an even further aspect, a method of operating a grinding mechanism includes pivoting a lever about a lever axis and rotating a grinder bit about a grinder bit rotational axis at least approximately parallel to the lever axis in response to the pivoting of the lever about the lever axis.

In yet an even further aspect, a method of operating a grinding mechanism includes pivoting a cam about a cam axis, and pivoting an engagement surface about an adjustment axis with respect to a grinder bit where the adjustment axis is perpendicular to the cam axis to adjust a spacing between the engagement surface and the grinder bit.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with mills and grinding mechanisms have not been shown or described in detail to avoid unnecessarily obscuring descriptions of the embodiments of the invention.

Unless the context requires otherwise, throughout the specification and claims which follow, the word "comprise" and variations thereof, such as "comprises" and "comprising" are to be construed in an open, inclusive sense, that is, as "including, but not limiting to."

The headings provided herein are for convenience only and do not interpret the scope of meaning of the claimed invention.

Figure 1:
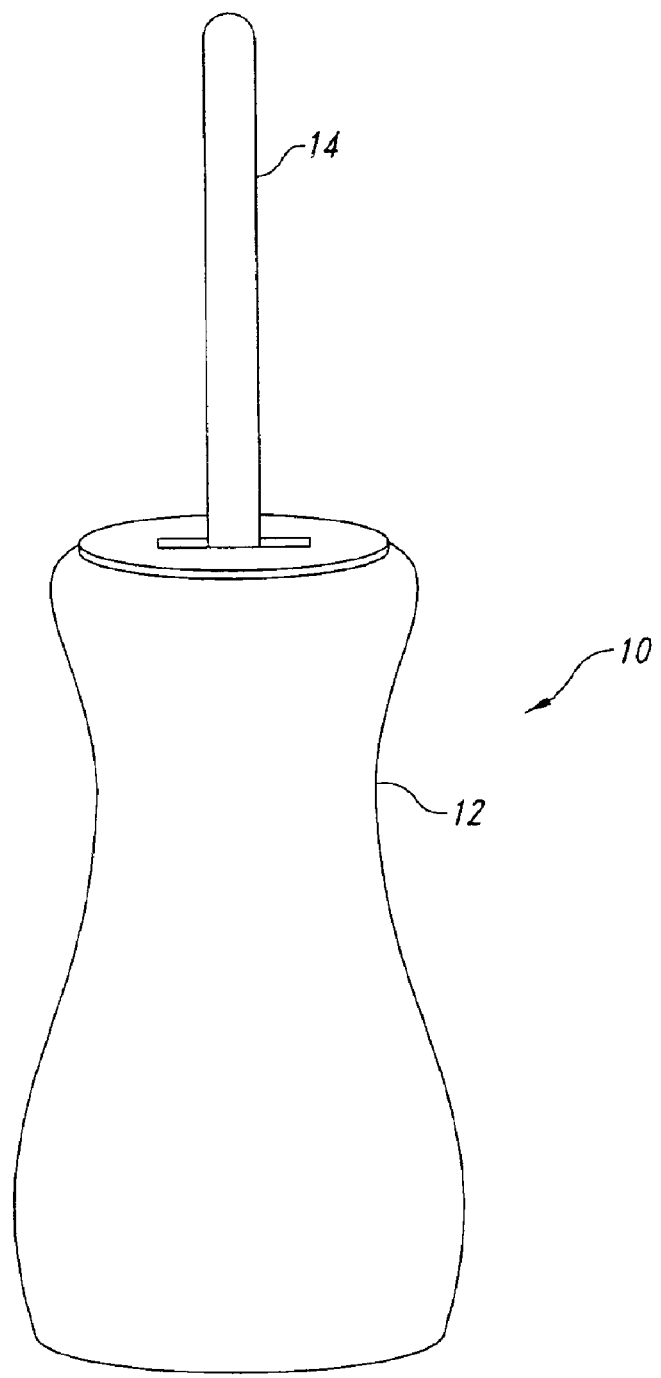
FIG. 1 is a side, top isometric view of a mill for grinding material such as spices or grain.

FIG. 1 shows a grinder or mill 10 for grinding a material such as spices (e.g., pepper, salt) or grains. The mill 10 includes a body 12 and a lever 14 at least a portion of which is accessible from outside the body 12. The body 12 may take the form of a body of revolution, although any other aesthetically pleasing shape may be employed.

Figure 2:
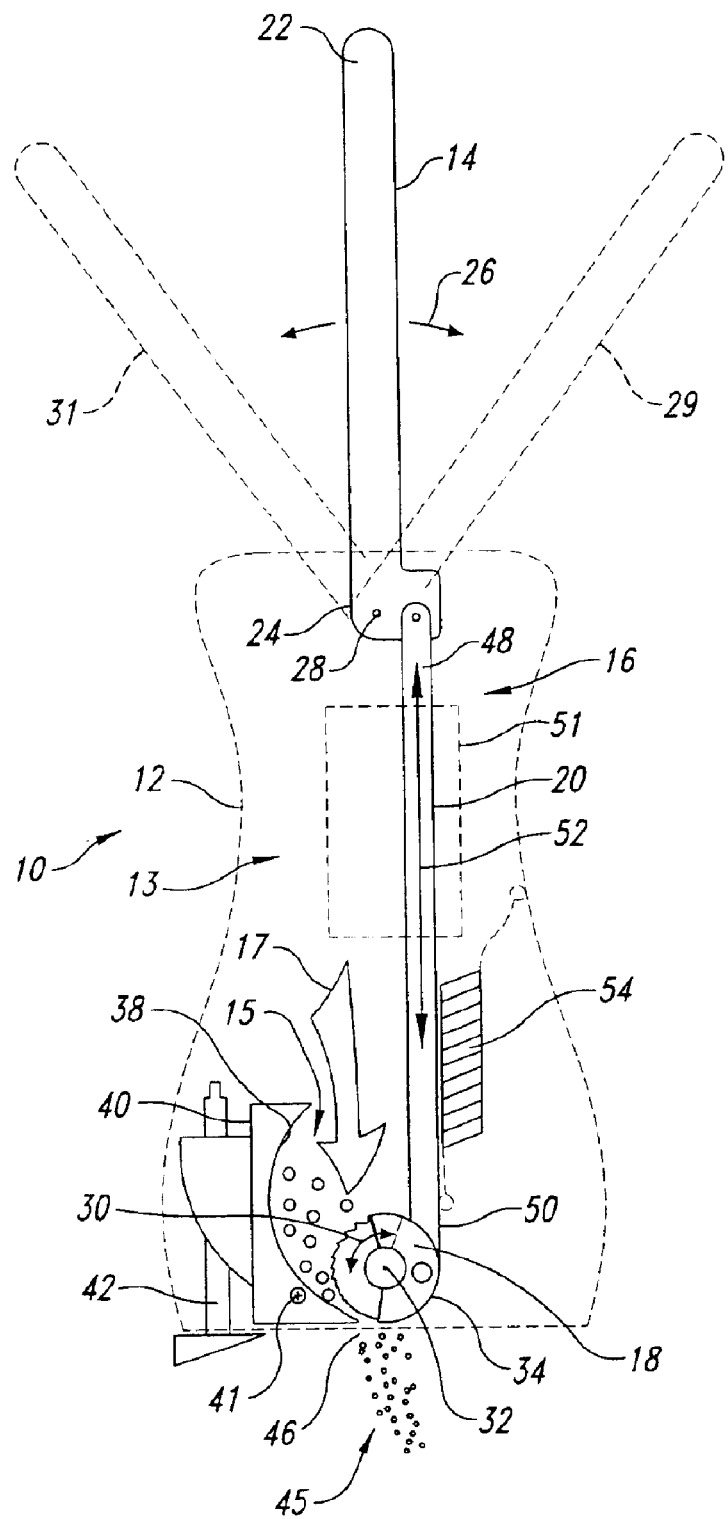
FIG. 2 is a cross-sectional view of the mill of FIG. 1, taken through the longitudinal axis of a body of the mill, showing a grinding mechanism including a lever, linkage, grinding bit, engagement member having an engagement surface, and cam, and also showing material to be ground within a chamber formed by the body and ground material exiting the mill.

FIG. 2 shows a grinding mechanism 16 of the mill 10. The grinding mechanism 16 includes the lever 14, a grinding bit 18, and a linkage 20 drivingly coupling the lever 14 to the grinding bit 18. The lever 14 includes a first end 22 and a second end 24, and is mounted proximate the second end 24 for reciprocating pivotal movement illustrated by double-headed arrow 26 about a lever axis 28. The lever 14 has a neutral position, illustrated in solid line in FIG. 2. In one embodiment, the lever 14 can be reciprocatingly moved between the neutral position and one of a pair of fully displaced positions 29, 31, illustrated in broken line in FIG. 2. In another embodiment, the lever 14 can be reciprocatingly moved between the pair of fully displaced positions. The lever 14 can be operated using one hand, while the other hand holds the body 12 of the mill 10.

The grinding bit 18 may take the form of a wheel or cylinder mounted for rotation, illustrated by double-headed arrow 30, about a grinding bit rotation axis 32. The lever axis 28 and grinding bit rotation axis 32 are parallel within acceptable manufacturing tolerances. The illustrated grinding bit is cylindrical, in contrast to the conical grinding bits typically employed in rotary grind mechanisms, and may take the form of a right cylinder. The grinding bit 18 may include an edge or periphery 34. The grinding bit 18 may also include one or more grinding protuberances, discussed in detail below with reference to FIGS. 3–5.

The grinding bit 18 cooperates with an engagement surface 38 of an engagement member 40 such as a shear block, the engagement surface 38 being opposed to, and spaced from, the grinding bit 18 to receive and grind a material to be ground 15 therebetween. In particular, the illustrated engagement surface 38 is arcuate proximate at least one end 43 thereof, the arcuate portion having a radius of curvature complementing a radius of curvature of the periphery 34 of the grinding bit 18. In the alternative, the engagement surface 38 of the grinding bit 18 can be formed without the arcuate portion, without deviating from of the invention. The material to be ground 15 may be stored in a chamber 13 formed by the body 12 of the mill 10. The flow of material to be ground 15 from the chamber 13 to the grinding bit 18 is illustrated by arrow 17. The ground material 45 exits the mill 10 via an exit aperture 46, typically in the bottom of the body 12.

The space between the grinding bit 18 and the engagement surface 38 is adjustable by way of a cam mechanism 42, which pivots the engagement member 40 about and adjustment axis 41, as illustrated and discussed in more detail below with reference to FIGS. 6–11.

The linkage 20 has a first end 48 and a second end 50. The first end 48 of the linkage 20 is pivotally coupled to the second end 24 of lever 14, spaced from the lever axis 28 to gain mechanical advantage. The second end 50 of the linkage 20 is pivotally coupled to the grinding bit 18, spaced from the grinding bit rotation axis 32. As the lever 14 is moved from the neutral position to the fully displaced positions, the linkage 20 translates in a linkage plane 51 illustrated by broken line box. The linkage plane 51 is perpendicular to the lever axis 28 and the grinding bit rotation axis 32. The linkage 20 may also rotate slightly, within the linkage plane 51. In contrast to typical rotary grinding mechanisms, this rotation is about an axis that is perpendicular to a longitudinal axis illustrated by double-headed arrow 52 of the linkage 20.

The mill 10 may include an optional biasing member, such as a spring or other resilient member. For example, a compression spring 54 is coupled between the body 12 and the linkage 20 to bias the lever 14 toward the neutral position from the displaced positions. In alternative embodiments, the biasing member may be coupled between the body 12 and the lever 14 or grinding bit 18. In further alternatives, the biasing member may be coupled between various elements of the grinding mechanism 16. For example, the biasing member may take the form of a coil or spiral spring coupled to the grinding bit. Alternatively, the mill 10 may omit the biasing member, relying on the user to return the lever 14 to the neutral position from one or both displaced positions.

Figure 3:
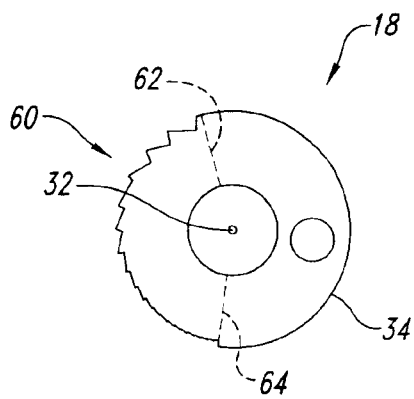
FIG. 3 is a side elevational view of an exemplary grinding bit including a set of grinding protuberances in the form of a gradated set of teeth.

FIG. 3 shows one embodiment of the grinding bit, having a set of grinding protuberances in the form of a set of teeth 60 on the periphery 34 of the grinding bit 18. The teeth 60 may be gradated between a first angular position 62 and a second angular position 64, as illustrated in FIG. 3. Thus, the size of the teeth 60 becomes increasingly smaller as the periphery 34 is transversed between the first angular position 62 and the second angular position 64. In one embodiment, each tooth 60 is successively smaller than a previous tooth as the periphery is transversed from the first to the second angular positions 62, 64, respectively. In another embodiment, the teeth 60 are grouped in sections, each section having teeth 60 of a uniform size, with the section having the largest teeth 60 positioned proximate the first radial position 62 and the section having the smallest teeth 60 positioned proximate the radial position 64. Thus, there is a gradation in size of the teeth 60 between the various sections, but uniformity of size of the teeth 60 within any given section.

The larger teeth 60 may be positioned toward a top of the mill 10, where the material to be ground 15 first enters the space between the grinding bit 18 and the engagement surface 38. The smaller teeth 60 may be positioned relatively toward the bottom of the mill 10, close to the exit aperture 46, where the ground material 45 exits the body 12 of the mill 10. The grinding bit 18 may employ other arrangements of teeth or grinding protuberances, although this arrangement ensures that the material 15 is successively acted upon by successively finer teeth as the particle size of the material becomes successively smaller. One skilled in the art will also recognize that the grinding protuberances may extend completely about the periphery 34 of the grinding bit 18, for example, where such would lower the manufacturing cost of the grinding bit 18.

Figure 4:
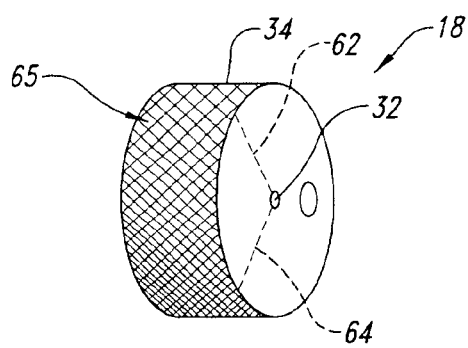
FIG. 4 is an isometric view of an exemplary grinding bit including a set of grinding protuberances in the form of a knurled gradated surface.

FIG. 4 shows another embodiment of the grinding bit 18, having a set of grinding protuberances in the form of a knurled surface 65 on the periphery 34 of the grinding bit 18. As illustrated, the knurled surface 65 may be gradated between the first and the second angular positions 62, 64, respectively. Alternatively, the knurled surface may be uniform between the angular positions 62, 64. The grinding bit 18 may employ other textured surfaces as the grinding protuberances, or may even omit texture in some embodiments.

Figure 5:
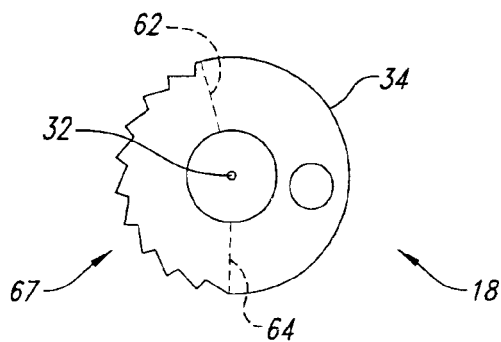
FIG. 5 is a side elevational view of an exemplary grinding bit including a set of grinding protuberances in the form of a set of uniformly sized teeth.

FIG. 5 shows yet another embodiment of the grinding bit 18, having a set of grinding protuberances in the form of a set of uniformly sized teeth 67 between the first and the second angular positions 62, 64, respectively, on the periphery 34 of the grinding bit 18.

Figure 6:
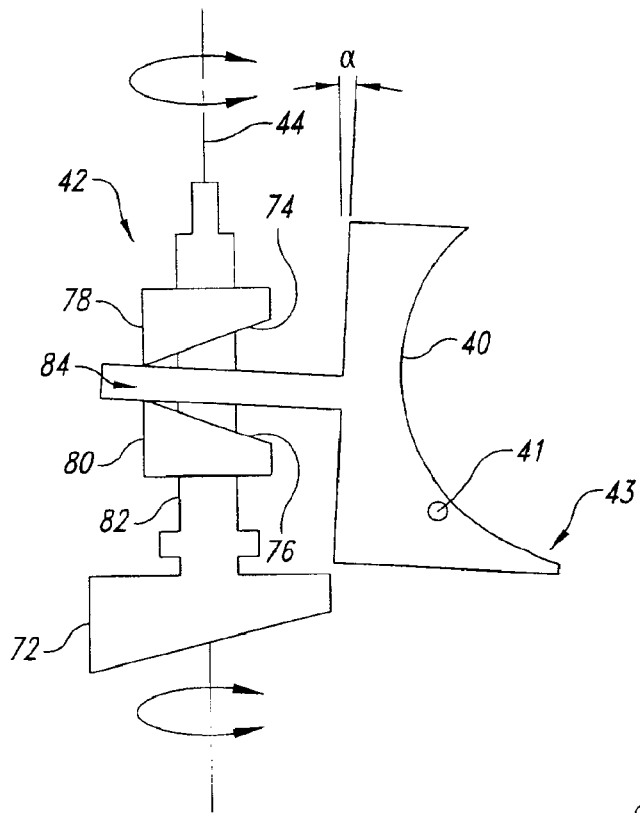
FIG. 6 is a side elevational view of a first adjustment mechanism including a set of cams having opposed cam surfaces, rotated to pivotally position the engagement member in a first position.
Figure 7:
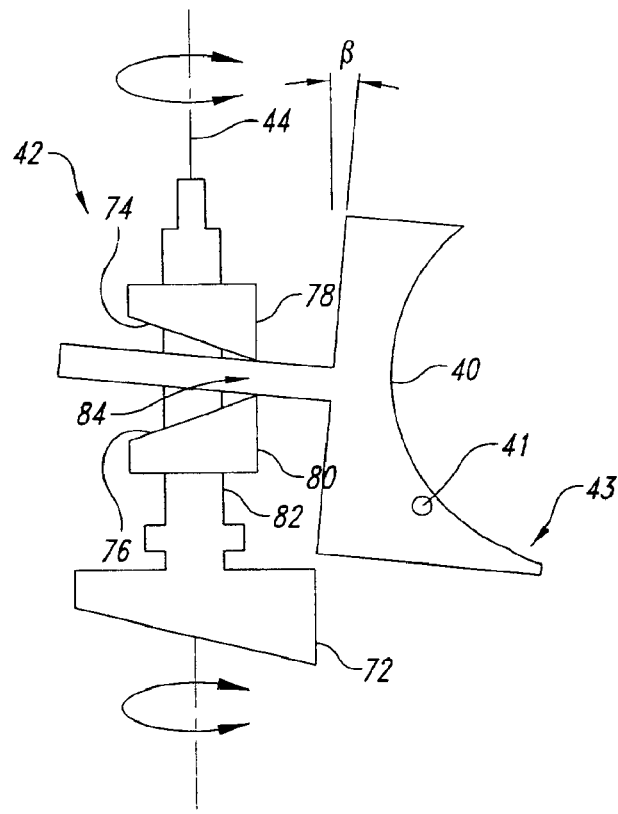
FIG. 7 is a side elevational view of the first adjustment mechanism of FIG. 6 illustrating the cams rotated 180 degrees from that of FIG. 6, to pivotally position the engagement member in a second position.

FIGS. 6 and 7 show a first adjustment mechanism, employing the cam 42 to pivot the engagement member 40 about the adjustment axis 41 to adjust the space between the engagement surface 38 and the grinding bit 18. The cam 42 is mounted for rotation about a cam axis 44, and includes an operating mechanism such as a lever or tab 72 accessible from outside the body 12 of the mill 10. The cam 42 includes at least one cam surface 74 for engaging a portion of the engagement member 40 to rotate the engagement member 40 between a first position illustrated in FIG. 6 and a second position illustrated in FIG. 7. Thus, the engagement member 40 pivots between an angle α and an angle β. In the illustrated embodiment, the cam 42 includes a second cam surface 76 opposed to the first cam surface 74. The cam surfaces 74, 76 may be formed as beveled discs 78, 80 on a shaft 82. The cam surfaces 74, 76 can be arranged to form a necked region 84 therebetween to further urge the engagement member 40 into the desired position.

Figure 8:
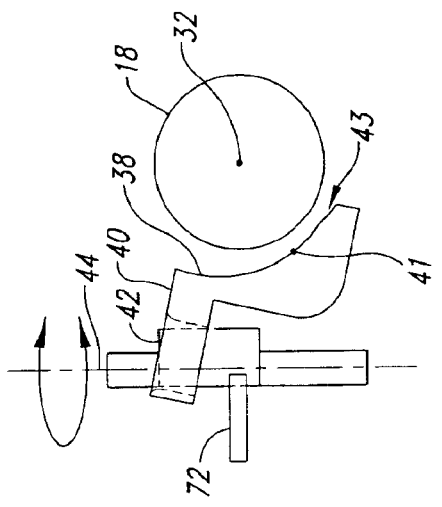
FIG. 8 is a side elevational view of a second adjustment mechanism including a cam rotated to pivotally position the engagement member in a first position.
Figure 9:
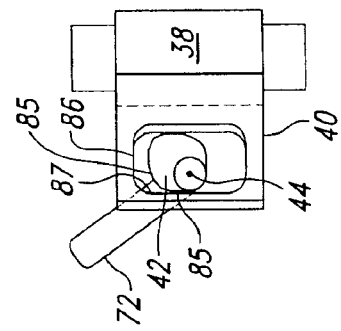
FIG. 9 is a top plan view of the second adjustment mechanism, the cam rotated to pivotally position the engagement member in the first position of FIG. 8.
Figure 10:
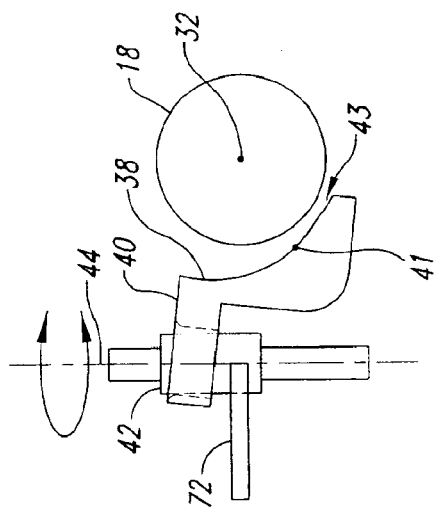
FIG. 10 is a side elevational view of the second adjustment mechanism of FIG. 8, illustrating the cam rotated from that of FIG. 8, to pivotally position the engagement member in a second position.
Figure 11:
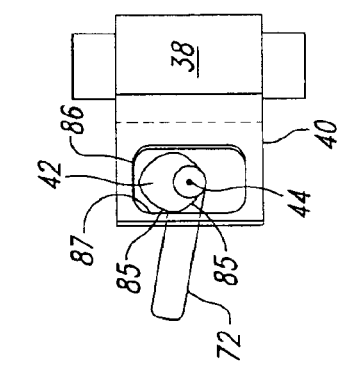
FIG. 11 is a top plan view of the second adjustment mechanism, the cam rotated to pivotally position the engagement member in the second position of FIG. 10.
Figure 12:
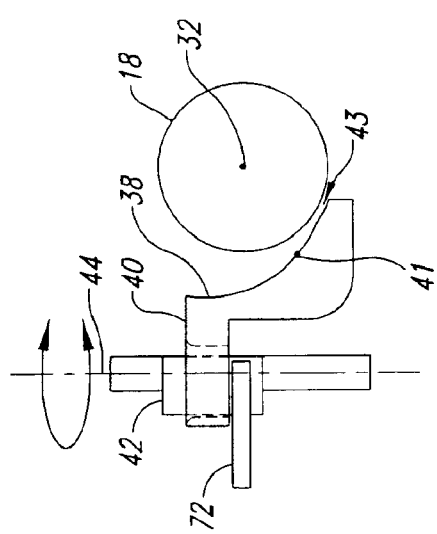
FIG. 12 is a side elevational view of the second adjustment mechanism of FIG. 8, illustrating the cam further rotated from that of FIG. 10, to pivotally position the engagement member in a third position.
Figure 13:
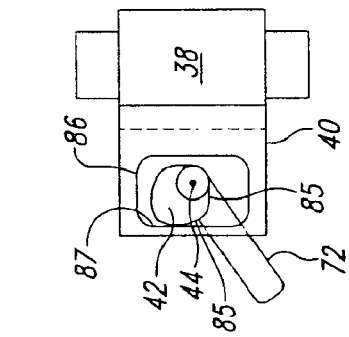
FIG. 13 is a top plan view of the second adjustment mechanism, the cam rotated to pivotally position the engagement member in the third position of FIG. 13.

FIGS. 8–13 show a second adjustment mechanism, employing a cam 42 to pivot the engagement member 40 about the adjustment axis 41 to adjust the space between the engagement surface 38 and the grinding bit 18. The cam 42 is mounted for rotation about an off-centered cam axis 44, and selectively engages portions of the engagement member 40. For example, in the illustrated embodiment the cam 42 engages portions of a cam slot 86 formed in or through the engagement member 40. The second adjustment mechanism includes an operating mechanism such as a lever or tab 72 coupled to turn the cam 42 and accessible from outside the body 12 of the mill 10. The cam 42 may have a variety of cross-sections, including but not limited to non-circular cross-sections such as an ellipse. As illustrated in FIGS. 9, 11 and 13, the cross-section of the cam 42 may further include a number of flatten portions 85 that serve as detents to create a number of discrete adjustments to the spacing between the engagement surface 38 and the grinding bit 18.

In FIG. 9 the tab 72 is in a first angular position about the cam axis 44 such that the cam 42 engages a portion 87 of the cam slot 86. As shown in FIG. 8, the engagement permits the engagement member 40 to assume a first angular position about the adjustment axis 41, producing a first spacing between the engagement surface 38 and the grinding bit 18.

In FIG. 11 the tab 72 is rotated to a second angular position about the cam axis 44 from that shown in FIG. 9, such that the cam 42 engages a portion 87 of the cam slot 86. As shown in FIG. 10, the engagement permits the engagement member 40 to assume a second angular position about the adjustment axis 41, producing a second spacing between the engagement surface 38 and the grinding bit 18. The second spacing is greater than the first spacing shown in FIG. 8. As best illustrated in FIG. 10, the cam slot 86 may be tapered or include a filet or rounded edges to provide sufficient clearance for the engagement ember to rotate about the adjustment axis.

In FIG. 13 the tab 72 is further rotated to a third angular position about the cam axis 44 from that shown in FIG. 11, such that the cam 42 engages a portion 87 of the cam slot 86. As shown in FIG. 12, the engagement permits the engagement member 40 to assume a third angular position about the adjustment axis 41, producing a third spacing between the engagement surface 38 and the grinding bit 18. The third spacing is greater than the second spacing shown in FIG. 10.

As will be recognized by those skilled in the art, where the cross-section of the cam 42 includes flatten portions, a discrete number of adjustments will be available. Where the cross-section of the cam 42 is a smooth curve, such as an ellipse, the number of available adjustments between some maximum and minimum spacing is unlimited.

Although specific embodiments of examples for the grinder or mill are described herein for illustrative purposes, various equivalent modifications can be made without departing from the spirit and scope of the invention, as will be recognized by those skilled in the relevant art. Teachings provided herein of the invention can be applied to other grinders or mills, not necessarily the exemplary mill generally described above.

These and other changes can be made to the invention in light of the above-detailed description. In general, in the following claims, the terms used should not be construed to limit the invention to the specific embodiments disclosed in the specification and the claims, but should be construed to include all grinders or mills that operate in accordance with the claims. Accordingly, the invention is not limited by the disclosure, but instead its scope is to be determined entirely by the following claims.

We claim:

1. A mill for grinding a spice or grain material, comprising:
   a body;
   a lever coupled to the body for pivotal movement about a lever axis;
   a grinder bit at least partially received in the body and mounted for pivotal movement about a grinder bit rotational axis;
   a linkage at least partially received in the body and mounted for translation in a linkage plane, the linkage plane being non-parallel to the grinder bit rotational axis, the linkage coupled to the lever and pivotally coupled to the grinder bit at a point on the grinder bit spaced from the grinder bit rotational axis; and
   an engagement surface opposed to the grinder bit and spaced therefrom to cooperatingly receive the material to be ground therebetween.

2. The mill of claim 1 wherein the linkage plane is approximately perpendicular to the grinder bit rotational axis.

3. The mill of claim 1 wherein the linkage is elongated and has a longitudinal axis, and wherein the linkage is also mounted for rotation in the linkage plane about an axis that is approximately perpendicular the longitudinal axis of the linkage.

4. The mill of claim 1 wherein the grinder bit includes a gradated set of grinding protuberances extending along at least a portion of a periphery thereof.

5. The mill of claim 1 wherein the grinder bit includes a set of peripheral grinding protuberances, at least some of the grinding protuberances being of different sizes, and wherein at least a larger one of the grinding protuberances is spaced relatively inward toward a chamber defined by the body for holding the material to be ground and a smaller one of the grinding protuberances is spaced relatively outward toward a neck formed by the engagement surface and the grinder bit.

6. The mill of claim 1 wherein the engagement surface is mounted for pivotal movement about an adjustment axis, the adjustment axis being approximately parallel to and spaced from the grinder bit rotational axis.

7. The mill of claim 1 wherein the engagement surface is mounted for pivotal movement about an adjustment axis, the adjustment axis being approximately parallel to and spaced from the grinder bit rotational axis, and further comprising:
   a cam coupled to the engagement surface, and selectively operable to pivot the engagement surface about the adjustment axis to adjust a size of the space between the engagement surface and the grinding bit.

8. The mill of claim 1 wherein the body defines a first chamber to hold the material to be ground, the first chamber in fluid communication with the grinder bit.

9. The mill of claim 1 wherein the body is a body of revolution having a longitudinal axis and the linkage is an elongated member having a longitudinal axis, and the longitudinal axis of the linkage member is not coincident with the longitudinal axis of the body.

10. The mill of claim 1, further comprising:
    a lever at least partially accessible from outside of the body and mounted for pivotal movement about a lever axis, the lever coupled to the linkage to transfer pivotal movement of the lever to the grinder bit by way of translation and rotation of the linkage in the linkage plane.

11. The mill of claim 1, further comprising:
    a biasing member coupled between the body and the linkage to bias the lever into a neutral position.

12. A grinding mechanism for a grinder, comprising:
    a lever mounted for pivotal movement about a lever axis;
    a grinder bit having a grinding surface, the grinder bit mounted for rotational movement about a grinder bit rotational axis, the grinder bit rotational axis being at least approximately parallel to the lever axis; and
    a linkage pivotally coupled to the grinder bit and pivotally coupled to the lever to transfer pivotal movement from the lever to the grinding bit.

13. The grinding mechanism of claim 12 wherein the linkage is elongated and has a first end and a second end opposed to the first end, the first end of the linkage pivotally coupled to the lever spaced from the lever axis and the second end of the linkage pivotally coupled to the grinder bit spaced from the grinder bit rotational axis.

14. The grinding mechanism of claim 12 wherein the linkage translates in a plane that is not parallel to the grinder bit rotational axis.

15. The grinding mechanism of claim 12 wherein the linkage translates in a plane that is at least approximately perpendicular to the grinder bit rotational axis.

16. The grinding mechanism of claim 12, further comprising:
    an engagement member having an engagement surface opposed to, and spaced from, the grinder bit to receive material to be ground therebetween.

17. The grinding mechanism of claim 12, further comprising:
    an engagement member having an engagement surface opposed to, and spaced from, the grinder bit to receive material to be ground therebetween, the engagement member mounted to pivot toward and away from the grinder bit; and a cam surface engaging a portion of the engagement member to pivot the engagement member to selectively adjust the space between the grinder bit and the engagement surface of the engagement member.

18. The grinding mechanism of claim 12, further comprising:

a spring biasing the lever toward a neutral position.

19. The grinding mechanism of claim 12 wherein the grinder bit is cylindrical.

20. The grinding mechanism of claim 12 wherein the grinder bit is cylindrical and includes a gradated set of grinding protuberances along a periphery thereof.

21. A grinding mechanism, comprising:

a grinding bit mounted for rotation;

an engagement member having an engagement surface opposed to the grinding bit, the engagement member mounted for pivotal movement about an adjustment axis with respect to the grinding bit to selectively adjust a space between the grinding bit and the engagement surface of the engagement member to receive material to be ground therebetween, the engagement member including an elongated slot; and a cam mounted at least partially within the elongated slot for rotation about a cam axis, the cam having a first cam surface operationally engaging a portion of the elongated slot.

22. The grinding mechanism of claim 21 wherein the cam includes a second cam surface opposed to the first cam surface, the second cam surface engaging a portion of the engagement member.

23. The grinding mechanism of claim 21 wherein the cam includes a second cam surface engaging a portion of the engagement member, the first and second cam surfaces formed by opposed beveled faces defining a necked region therebetween.

24. The grinding mechanism of claim 21 wherein the adjustment axis is parallel to an axis of rotation of the grinding bit.

25. The grinding mechanism of claim 21 wherein the adjustment axis is perpendicular to the cam axis.

26. The grinding mechanism of claim 21 wherein the adjustment axis is parallel to an axis of rotation of the grinding bit and the adjustment axis is perpendicular to the cam axis.

27. The grinding mechanism of claim 21 wherein the grinder bit is cylindrical and includes a gradated set of grinding protuberances along a periphery thereof.

28. The grinding mechanism of claim 21 wherein the engagement surface is arcuate proximate at least one end thereof, the arcuate portion having a radius of curvature complementing a radius of curvature of a periphery of the grinding bit.

29. The grinding mechanism of claim 21 wherein the cam axis is offset from a center of a cross-section of the cam.

30. The grinding mechanism of claim 21 wherein the cam axis is perpendicular to the adjustment axis.

31. The grinding mechanism of claim 21 wherein the cam has a non-circular cross-section including at least two flatten portions.

32. A spice mill, comprising:

a lever mounted for pivotal movement about a lever axis;

rotatable grinding means mounted for rotation about a grinder rotation axis, the grinder axis parallel to the lever axis;

engagement means operatively positioned with respect to the rotatable grinding means to cause spice to be milled when positioned therebetween and the lever actuated; and axial linking means pivotally coupled to both the lever and the rotatable grinding means for transferring movement of the lever to actuate the rotatable grinding means.

33. The spice mill of claim 32 wherein the axial linkage means couples the pivotal movement of the lever to the rotatable grinding means at least in part as translation in a linkage plane that is perpendicular to the grinder rotation axis.

34. The spice mill of claim 32, further comprising:

an engagement surface spaced from the rotatable grinding means to receive a spice to be ground therebetween; and cam means for adjusting a position of the engagement surface with respect to the grinding means.

35. The spice mill of claim 32, further comprising:

means for biasing the lever toward a neutral position.

\* \* \* \* \*